3,423,410
METHOD FOR PRODUCING MELAMINE
Nobuhiko Takahashi, Ryo Kokubo, Mizuhiko Nagakura, and Mitsuhiro Koguchi, Fuchu-machi, Nei-gun, and Atsuo Murata, Tokyo, Japan, assignors to Nissan Kagaku Kogyo Kabushiki Kaisha, Tokyo, Japan
Filed Dec. 10, 1965, Ser. No. 513,020
Claims priority, application Japan, Dec. 18, 1964, 39/7,100
U.S. Cl. 260—249.7
Int. Cl. C07d 55/28
3 Claims

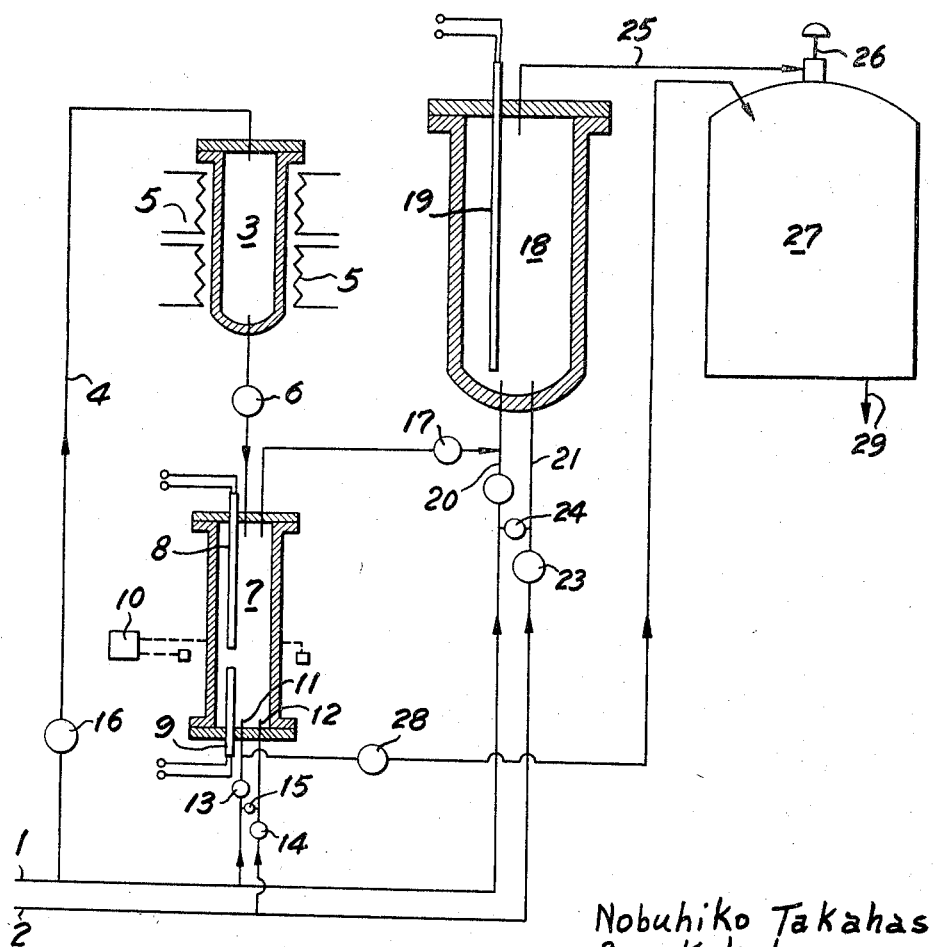

ABSTRACT OF THE DISCLOSURE

A method for starting up of melamine production for urea in a main reactor in liquid phase at high temperatures and pressures, comprising melting melamine in a small volume melting tank, introducing the melt into a small sub-reactor having internal upper and lower heaters until lower heaters are immersed in molten melamine, introducing urea and ammonia into bottom of the sub-reactor to initiate reaction until sub-reactor is filled, actuating upper heaters, passing the molten melamine to a main reactor and thereafter introducing urea and ammonia into said main reactor. Among known uses of melamine is the formation of synthetic resins with formaldehyde.

---

This invention relates to a method for starting the melamine-producing process which is carried out continuously under high-pressure an in the liquid phase.

Many patents and articles describing production of melamine by pyrolysis of urea have already been published, and such pyrolysis processes have been considered to be extremely advantageous as compared with that wherein dicyandiamide is used as a starting material. Among the pyrolysis processes only the high-pressure liquid-phase one has been recognized as making possible an industrially continuous production of melamine especially on an economical scale.

There have been, however, several problems which make it difficult to conduct said synthesis of melamine from urea continuously. The problem which has been considered to be the most troublesome is the fact that solids having no fluidity are produced in the course of melamine production at a high temperature and pressure, which may render the contents of a reactor not only unhomogeneous solids but also prevent flow into the following step, thus resulting in the creation of an extremely high pressure and finally destruction of the apparatus.

In order to make a continuous synthetic operation possible by eliminating such solidification and blockage within the reaction system, various processes have been proposed such as a process wherein the linear velocity within a reactor is kept at a higher level (Japanese Patent Publication No. 4783/1954), a process wherein the reaction step is divided into the former and latter parts (Japanese Patent Publication No. 18046/1964), a process wherein urea in a molten state is introduced to the system in which a large quantity of produced melamine is made to circulate (U.S. Patent No. 2,776,284) and the like.

We have found and already proposed a process characterized by continuously introducing urea and ammonia into a large diameter cylindrical reactor (a main reactor) at the bottom thereof; converting the urea to melamine, in a liquid phase consisting mainly of molten melamine, by maintaining the reaction temperature in the range of 390 to 450° C. and the partial pressure of the ammonia in the range of 74 to 140 kg./cm.$^2$; and then continuously discharging the molten melamine in liquid phase from the main reactor at the top thereof.

In that process non-fluid solids are produced in the main reactor at the start of synthetic operations, if the molten urea is allowed to fill up the reactor and then heated to carry out the melamine-producing reaction.

Accordingly, it is necessary to have the main reactor filled with melamine in a molten state prior to the commencement of the reaction in order to start said reaction successfully.

Stable molten melamine can be obtained from solid melamine powder, without any decomposition such as liberation of ammonia from the melamine, by heating the powder in a pressure-proof closed-type vessel at a temperature above 360° C. in the presence of ammonia gas at more than 60 kg./cm.$^2$. Now, however, if a large diameter cylindrical reactor (a main reactor) provided with heaters therein is filled up with powdery melamine whose apparent specific weight is 0.7 together with ammonia and subsequently heated from the outside or inside of said reactor, it will be only the lower portion (about 60% volume based on the whole of said reactor) of the main reactor that can be filled with molten melamine, since the specific weight of the molten melamine is 1.2 while the apparent one of the original powdery melamine 0.7.

Thus, under such conditions, it is disadvantageous to start the reaction, because of the presence of solids within the reactor, even when continuously introducing urea and ammonia to the reactor.

If double-tube electric heaters are used as those installed within the main reactor, the portions of the heaters appearing above the surface of the molten melamine will be so highly overheated as to damage the heaters and stop operations. Accordingly, the aforementioned facts will make it impossible to start melamine-producing operations successfully.

On the other hand, it is theoretically possible that a second pressure-proof closed-type vessel which can hold powdery melamine in an amount equal to that of molten melamine with which the main reactor can be filled is provided in order to allow molten melamine previously prepared in said second vessel to flow into said reactor. The arrangement, however, is economically disadvantageous in practice since the apparatus will not only be very expensive but also require much labor for the following reasons. The reasons are that the closed-type vessel corresponding to the main reactor which has heaters therein and is usually extremely large will inevitably be enormous in its volume and will require lining of its inner surfaces with titanium, Hastelloy, etc. to keep the vessel corrosion-resistant at a high temperature. This will also require attachment of heaters to the vessel to melt powdery melamine.

In order to overcome such disadvantages as mentioned above, we have established a novel process in which melamine-producing operations can easily and reasonably be commenced without depositing any solids by using a set of apparatuses, devised by us, which includes a small melting tank and a small sub-reactor attached to a main reaction system. The sub-reactor is lined with corrosion-resistant metals on its internal surfaces and has covers at its top and bottom each of which is fitted up with double-tube electric heaters made of corrosion-resistant metals.

It is to be noted that the lengths of the heaters inserted inside the sub-reactor through the bottom thereof are about half that of the other heaters through the top hereof. The total heating capacities of the upper and lower heaters is determined on the basis of heat necessary for carrying out the melamine-producing reaction, that is, so that the main reactor may be perfectly filled up in 10–48 hours with molten melamine by transferring the molten melamine (prepared in the sub-reactor) from the latter reactor to the former one.

The inner volume of the small melting tank made of corrosion-resistant metals which is situated above the sub-reactor is so large that, when powdery melamine charged into said tank has been transferred in molten state into the sub-reactor, the molten melamine may fill about one-third portion of the inner space of the reactor and immerses perfectly the whole mass of the lower double-tube electric heaters therein. For example, the inner volume of the melting tank should be 290 liters if that of the subreactor be 500 liters.

The ratio of the volume of the sub-reactor to that of the melting tank may be suitably selected. For example, when the upper and lower double-tube electric heaters are equal in their lengths, that inner volume of the melting tank corresponding to 500 liters of the sub-reactor may be 430 liters.

The melting tank is fitted up with external heaters surrounding its wall. Powdered melamine is charged in the tank and can be transformed into melt by heating for 5–10 hours at 380–420° C.

The molten melamine prepared in the melting tank is passed, under an ammonia pressure of 80–100 kg./cm.$^2$, into the sub-reactor preheated at 380–420° C., and whether or not the lower double-tube heaters within the sub-reactor have been perfectly immersed in said molten melamine is detected by a radiation liquid-level gauge. When the lower heaters have been perfectly immersed in the molten melamine, ammonia heated to 380–420° C. and pressurized to 80–100 kg./cm.$^2$ begins to be continuously introduced little by little to the sub-reactor through ammonia and urea feed pipes at the bottom of said reactor. This introduction of the ammonia is intended to prevent the molten melamine from flowing down into, solidifying in and then blocking up the urea and ammonia feed pipes.

Then suitable amounts of urea and ammonia are introduced to the sub-reactor from the bottom to initiate the melamine producing reaction, wherein said amount of urea depends on the heat provided by the lower double tube electric heaters. When the sub-reactor is filled with molten melamine, the upper-double tube electric heaters are set in operation and urea and ammonia are successively fed into the reactor, the amount depending on the total heat given by all heaters within the sub-reactor.

The melamine molten in the sub-reactor is discharged therefrom and introduced into the main reactor (through the bottom thereof) preheated to 380–420° C. by the heated and pressurized ammonia. This operation is continued for 10–48 hours and whether the main reactor has been thoroughly filled up with the molten melamine can be ascertained by a portion of said melamine spouting into a separator. At this time the feeding of urea to the sub-reactor is stopped as is heating of the sub-reactor and the sub-reactor is cut off from the main reactor.

On the other hand, molten urea in an amount as usually used on an industrial scale is supplied, instead of the ammonia, to the principal reactor through the urea feed pipe (through which a minor portion of the ammonia continues to be introduced in order to prevent the pipe from being blocked up, as in the sub-reactor) and both the internal heaters are switched on to start an industrial scale operation of manufacturing melamine.

The portion of the molten melamine still remaining in the sub-reactor after the end of the operation is discharged into the separator for recovery thereof and use of the melting tank and sub-reactor is stopped independently of the manufacturing operation of the main reactor.

As an alternative to the above described invention—it might be proposed to combine a main reactor in which internal heaters are divided into two groups (upper and lower ones) with a melting tank whose volume corresponds to such a volume of said reactor as to immerse the whole of the lower double-tube heaters therein, without employing a sub-reactor attached to the main reaction system. However, the main reactor is generally extremely large and required to have a long lifetime, so the main reactor can hardly be of such complicated structure requiring extensive mechanical tooling. The purpose is therefore not practical.

It will be apparent from the above explanation that the mere attachment of relatively inexpensive small-scale apparatus (namely, a melting tank and sub-reactor according to the present invention) to the main reaction system makes it possible to commence the industrial scale production of melamine by use of the high-pressure liquid-phase method very easily and safely without producing any non-fluid solids, in conversion of urea to melamine.

Now, the features of this invention shall be explained below, referring to the single figure.

Powdery melamine is charged into a melting tank 3 till the tank has been filled with melamine and then heated to give molten melamine by external heaters 5. In this case, heated and pressurized ammonia 1 is also introduced through an ammonia feed pipe 4 to the melting tank 3 to keep the molten melamine in a stable liquid phase under the pressurized ammonia.

The molten melamine is then sent to a sub-reactor 7 preheated to 380–420° C. from the melting tank 3, the inner pressure of which is maintained at a pressure which is 10 kg./cm.$^2$ higher than that of the sub-reactor 7 so that the molten melamine may easily flow into the sub-reactor 7 by adjusting the valve 13 of an ammonia feed pipe 11 leading to sub-reactor 7, an ammonia-introducing valve 15 connected to a urea feed pipe 12 and a valve 16. After ascertaining by a radiation liquid-level gauge 10 whether lower double-tube heaters 9 have been perfectly immersed in the molten melamine, said heaters are switched on, valves 6 and 15 closed, a valve 14 opened and molten urea supplied through the urea feed pipe 12 into the sub-reactor 7 to be converted to melamine. When the sub-reactor 7 has been filled up with molten melamine, the upper double-tube electric heaters 8 are made operative and urea feed through the urea feed pipe 12 increased followed by resulting molten melamine being transferred to the main reactor 18 previously heated to 380–420° C. through a valve 17, an ammonia feed pipe 20 leading to the reactor 18, and the bottom of said reactor 18, while ammonia is continuously introduced little by little to the main reactor via a valve 24 and urea feed pipe 21 to prevent the molten melamine from entering the urea feed pipe 21, solidifying itself and resultantly blocking said pipe 21.

When the molten melamine begins to spout into a separator 27 from a valve 26 through a pipe 25 after having perfectly filled up the main reactor therewith, the urea feed to the sub-reactor 7 is stopped by closing the valve 14 and also the heating is stopped by switching off the upper and lower double-tube electric heaters 8 and 9.

On the other hand, urea material subsequently begins to be supplied, in an amount corresponding to the predetermined output, into the main reactor 18 by closing the valve 24 and opening a valve 23, and at the same time double-tube electric heaters 19 are switched on thus commencing melamine-producing operations on an industrial scale.

The molten melamine remaining in the sub-reactor 7 can be made to spout into the separator 27 by opening a valve 28 to recover the melamine in a powdery form 29 after cooling it. Thereafter, both the melting tank 3 and sub-reactor 7 are made inoperative independently of the industrial-scale manufacturing operation of the main reactor 18.

This invention is concretely illustrated by the following examples.

Example 1

To a closed-type pressure-proof melting tank made of 20 Cr-30 Ni stainless steel which had an inner capacity of 290 liters were charged 230 kg. of powdery melamine (99.8% pure) followed by being heated externally under pressurized ammonia at 80 kg./cm.$^2$ to make said powdery melamine molten in 10 hours.

The molten melamine was then introduced to a 500-liter sub-reactor preheated at 390° C., which was made of 13 Cr stainless steel, lined with titanium and resistant to a pressure of 150 kg./cm.$^2$, to immerse therein thoroughly lower double-tube electric heaters of 1 meter in length. The thorough immersion was confirmed by a radiation liquid-level gauge.

Melamine production was then carried out in the sub-reactor while 21 pieces of the lower double-tube electric heaters having respective heating capacities of 5 kw. were in operation and 248 kg./hr. of urea were fed into said reactor. Thereafter, the sub-reactor was filled up with the molten melamine 6 hours after the commencement of the melamine production.

Subsequently, an additional 21 pieces of upper double-tube electric heaters having respective heating capacities of 10 kw. were set into operation and the urea feed was increased to 743 kg./hr. to give 260 kg./hr. of molten melamine, which melamine produced at said rate was transferred into a 4,170-liter (net inner capacity) main reaction and could fill up this reactor in 23.8 hours.

At this time an industrial scale melamine-producing operation was started independently of the melting tank and sub-reactor.

It was, therefore, 39.8 hours after the melting tank had begun to be heated that the industrial scale operation started.

Example 2

To a closed-type pressure-proof melting tank made of Cr-Mo stainless steel and lined with Hastelloy B which had an inner capacity of 500 liters, were charged 400 kg. of powdery melamine (99.5% pure) followed by application of external heating thereto under pressurized ammonia at 80 kg./cm.$^2$ to melt the whole of said powdery melamine in 7.5 hours. The resulting molten melamine was then introduced to a 980-liter (inner capacity) sub-reactor preheated at 390° C. which was made of 13 Cr stainless steel, lines with titanium and resistant to a pressure of 150 kg./cm.$^2$, to immerse completely lower double-tube electric heaters of 1.5 meter in their respective lengths in said molten melamine. The perfect immersion was confirmed by the radiation liquid-level gauge.

Melamine production was then conducted in the sub-reactor while 25 pieces of lower double-tube electric heaters having respective heating capacities of 8 kw. were switched on and urea was fed thereto in an amount of 482 kg./hr. Thus, the sub-reactor was filled up with the molten melamin 6.5 hours after the start of the melamine production therein. Subsequently, 25 pieces of upper double-tube electric heaters having respective heating capaciitees of 16 kw. were additionally turned on, urea feed was increased to 1,400 kg./hr. and the resulting molten melamine was transferred in an amount of 436 kg./hr. into a 4,170-liter (net inner capacity) main reactor maintained at a temperature of 400° C. to fill this reactor with molten melamine in 11.5 hours.

At this time when the main reactor has been full of the molten melamine, an industrial continuous operation was commenced independently of the melting tank and sub-reactor.

It was, therefore, 25.5 hours after the melting tank had begun to be heated that said operation commenced.

We claim:

1. A method for starting a melamine producing reaction in a main reactor in which urea is thermally converted to melamine in liquid phase at high temperatures and pressures in the presence of ammonia, comprising melting powdered melamine in a small volume melting tank in the presence of ammonia, introducing said melted melamine into a sub-reactor substantially smaller than the main reactor and having separate internal upper and lower heaters therein, when the lower heaters are immersed under the molten melamine introducing ura and ammonia through the bottom of the sub-reactor to initiate the melamine producing reaction and continuing this introduction until the sub-reactor is fillled, actuating the upper heaters, passing the molten melamine from the sub-reactor continuously to the main reactor having an internal heater and thereafter introducing urea and ammonia into said main reactor to commence the melamine producing reaction therein while withdrawing melamine produced continuously.

2. A method according to claim 1 wherein the molten melamine prepared in the melting tank is passed under an ammonia pressure of 80–100 kg./cm.$^2$ into the sub-reactor pre-heated at 380–420° C., thereafter introduction of molten urea is commenced, and the amount of the molten urea introduced is increased after the sub-reactor fills with molten melamine and the upper heaters are started.

3. A method according to claim 1 wherein after commencement of melamine production in the main reactor, feeding of urea to the sub-reactor is stopped and the heaters in said sub-reactor are turned off.

References Cited

UNITED STATES PATENTS

| | | | |
|---|---|---|---|
| 2,776,284 | 1/1957 | Hood | 260—249.7 |
| 2,776,285 | 1/1957 | Dyr | 260—249.7 |
| 3,116,294 | 12/1963 | Marullo et al. | 260—249.7 |

HENRY R. JILES, Primary Examiner.

JOHN M. FORD, Assistant Examiner.